UNITED STATES PATENT OFFICE.

HERMAN ROSENBERG, OF NEW YORK, N. Y., ASSIGNOR TO THE STANDARD VARNISH WORKS, OF SAME PLACE.

PROCESS OF SURFACING BODIES.

SPECIFICATION forming part of Letters Patent No. 639,867, dated December 26, 1899.

Application filed July 6, 1898. Serial No. 685,281. (No specimens.)

*To all whom it may concern:*

Be it known that I, HERMAN ROSENBERG, a citizen of the United States, and a resident of New York, in the county and State of New York, have invented a new and useful Process of Surfacing Bodies, of which the following is a specification.

My invention relates to the process of surfacing bodies to make them water and weather proof; and it consists, broadly, in first applying to the surface of the body to be treated an oil absorbent mingled with water and after drying applying oil to the said absorbent.

In carrying the process into practice I first apply to the surface of the wood, metal, or other body to be treated an oil absorbent—such, for example, as oxid of zinc and glue or soluble glass ground together in water and made of such consistency as to be readily applied by a brush or soft body—for example, to the consistency of ordinary paint. The proportions of oxid of zinc and glue or soluble glass may be varied at pleasure, the object of the glue or soluble glass being to cause the oxid of zinc or other pigment, which will readily absorb oil, to temporarily adhere to the surface during the drying of the water or other liquid which may be used to form the solution. When the liquid of the solution has been dried out of the oil-absorbing pigment, I proceed to apply a coating of oil—such, for example, as linseed-oil—and when this has hardened the surface may be rubbed down and again treated in a similar manner or may be covered with a finishing coat of varnish, as desired.

I have found by experiment that by the above process I am enabled in a few hours to produce a water and weather proof surface of high polish equal to that which has heretofore required days to accomplish.

The oil absorbent applied, mingled with water, creeps into the interstices of the body to be treated, and when the liquid of the solution is evaporated or dried out it leaves the oil-absorbing pigment full of minute pores, which by capillary attraction greedily absorb the oil and so minutely subdivide it that it will harden in a very short time, thereby putting the surface in condition for rubbing down, ready to receive a subsequent treatment.

This process differs from that commonly employed in applying a filling coat in that the treatment with the metallic oxid is not in itself a filling to be rubbed down and form a surface for paint, varnish, or oil, but is applied by means of a liquid which will readily dry out, leaving the interstices of the surface occupied by a highly-porous substance, which in turn will have a tendency to greedily absorb the oil when applied, thereby insuring a groundwork or surfacing coat of oil and the oxid, which will be to a considerable degree elastic and less liable to crack and at the same time well lodged in the surface interstices of the body treated, so that it will not have a tendency to flake off.

What I claim is—

The process of surfacing bodies preparatory to receiving the finishing coat, as, for example, of varnish, consisting in first applying to the surface of the body to be treated a metallic oxid mingled with water, then drying the surface, and then applying oil to the dry oxid-covered surface, substantially as set forth.

In testimony that I claim the foregoing as my invention I have signed my name, in presence of two witnesses, this 28th day of June, 1898.

HERMAN ROSENBERG.

Witnesses:
   FREDK. HAYNES,
   EDWARD VIESER.